US012619984B2

(12) United States Patent
Nagai et al.

(10) Patent No.: US 12,619,984 B2
(45) Date of Patent: May 5, 2026

(54) TRANSACTION MANAGEMENT SYSTEM AND TRANSACTION MANAGEMENT METHOD

(71) Applicant: Hitachi, Ltd., Tokyo (JP)

(72) Inventors: Takayuki Nagai, Tokyo (JP); Nao Nishijima, Tokyo (JP); Takahiro Sagara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 516 days.

(21) Appl. No.: 18/118,273

(22) Filed: Mar. 7, 2023

(65) Prior Publication Data

US 2023/0334485 A1      Oct. 19, 2023

(30) Foreign Application Priority Data

Apr. 15, 2022      (JP) .................................. 2022-067734

(51) Int. Cl.
    *G06Q 20/38*      (2012.01)
    *H04L 67/1097*    (2022.01)

(52) U.S. Cl.
    CPC ....... *G06Q 20/389* (2013.01); *H04L 67/1097* (2013.01); *G06Q 2220/00* (2013.01)

(58) Field of Classification Search
    CPC .............. G06Q 20/389; G06Q 2220/00; H04L 67/1097
    See application file for complete search history.

(56) References Cited

U.S. PATENT DOCUMENTS

| | | | | |
|---|---|---|---|---|
| 10,341,121 B2 * | 7/2019 | Androulaki | ........... | H04L 9/3242 |
| 11,373,177 B2 * | 6/2022 | Song | .................... | G06Q 20/382 |
| 2017/0046651 A1 * | 2/2017 | Lin | ........................ | H04N 5/913 |
| 2018/0276626 A1 * | 9/2018 | Laiben | .............. | G06Q 20/3829 |
| 2018/0337847 A1 * | 11/2018 | Li | ....................... | H04L 67/1029 |
| 2019/0102423 A1 | 4/2019 | Little et al. | | |
| 2020/0394177 A1 * | 12/2020 | Maurer | .............. | G06F 9/45508 |
| 2021/0288824 A1 | 9/2021 | Nakayama | | |

FOREIGN PATENT DOCUMENTS

| | | | | |
|---|---|---|---|---|
| JP | 2021-2129 A | 1/2021 | | |
| JP | 2021-144571 A | 9/2021 | | |
| WO | WO-2018175666 A1 * | 9/2018 | .............. | H04L 9/50 |

OTHER PUBLICATIONS

"Hyperledger Fabric", A Blockchain Platform for the Enterprise, online, searched on Dec. 1, 2021, Internet <URL: http://hyperledgerfabric.readthedocs.io/en/latest/>.
Japanese Office Action received in corresponding Japanese Application No. 2022-067734 dated Nov. 4, 2025.

\* cited by examiner

*Primary Examiner* — Lisa Hashem
(74) *Attorney, Agent, or Firm* — MATTINGLY & MALUR, PC

(57) ABSTRACT

In a transaction management system which is a distributed ledger system in which a business network is formed of a plurality of nodes, the node calculates an upper limit of the number of transactions that can be issued by each of a plurality of organizations according to a calculation rule shared among the nodes, and refuses to accept the transaction from an organization of the organizations of which the number of transactions in past exceeds the upper limit of the number of transactions.

11 Claims, 13 Drawing Sheets

FIG. 2

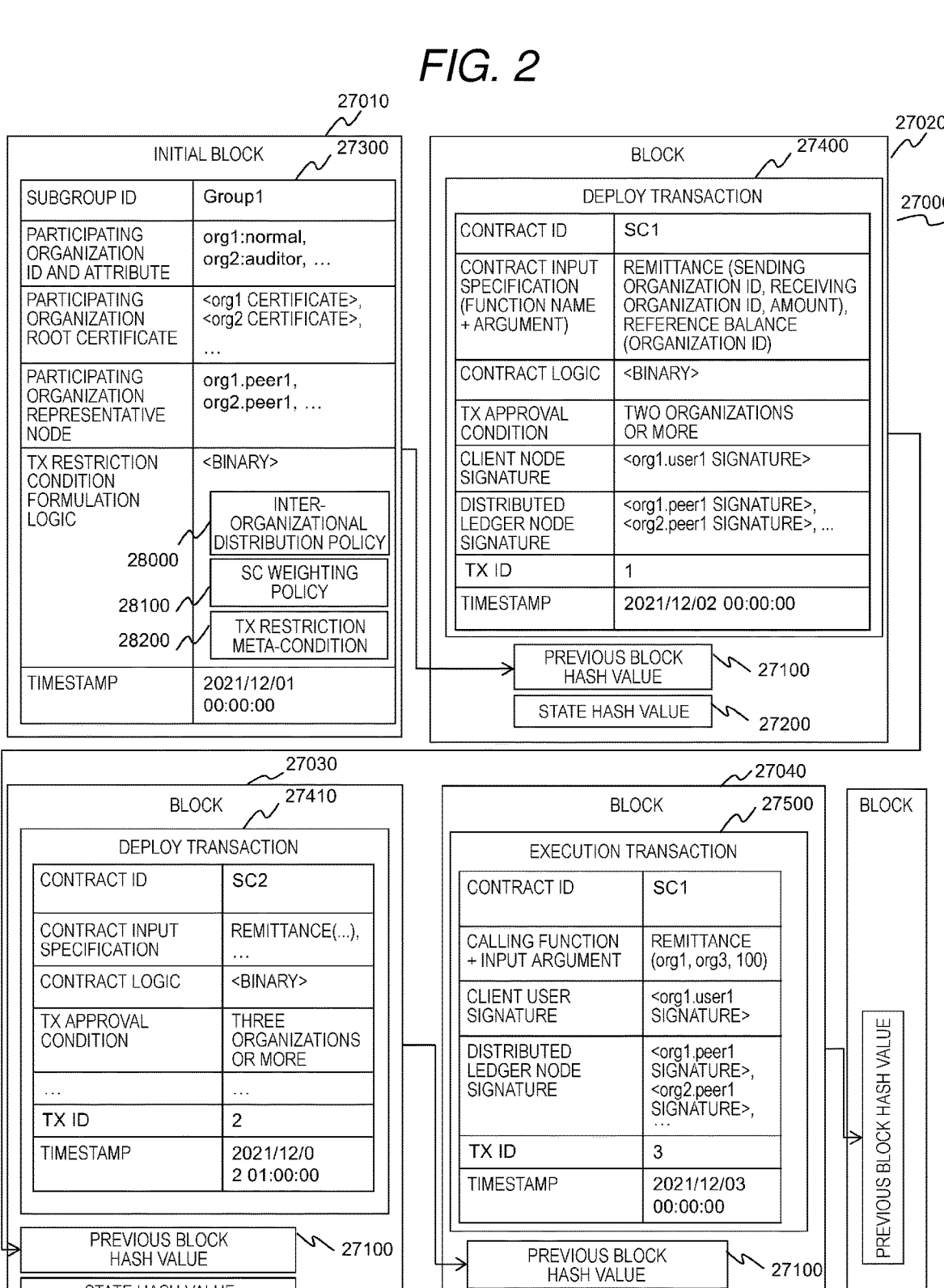

27010

| INITIAL BLOCK 27300 | |
|---|---|
| SUBGROUP ID | Group1 |
| PARTICIPATING ORGANIZATION ID AND ATTRIBUTE | org1:normal, org2:auditor, ... |
| PARTICIPATING ORGANIZATION ROOT CERTIFICATE | <org1 CERTIFICATE>, <org2 CERTIFICATE>, ... |
| PARTICIPATING ORGANIZATION REPRESENTATIVE NODE | org1.peer1, org2.peer1, ... |
| TX RESTRICTION CONDITION FORMULATION LOGIC | <BINARY> |

28000 — INTER-ORGANIZATIONAL DISTRIBUTION POLICY
28100 — SC WEIGHTING POLICY
28200 — TX RESTRICTION META-CONDITION

| | |
|---|---|
| TIMESTAMP | 2021/12/01 00:00:00 |

27020

27000

| BLOCK 27400 | | |
|---|---|---|
| DEPLOY TRANSACTION | | |
| CONTRACT ID | SC1 | |
| CONTRACT INPUT SPECIFICATION (FUNCTION NAME + ARGUMENT) | REMITTANCE (SENDING ORGANIZATION ID, RECEIVING ORGANIZATION ID, AMOUNT), REFERENCE BALANCE (ORGANIZATION ID) | |
| CONTRACT LOGIC | <BINARY> | |
| TX APPROVAL CONDITION | TWO ORGANIZATIONS OR MORE | |
| CLIENT NODE SIGNATURE | <org1.user1 SIGNATURE> | |
| DISTRIBUTED LEDGER NODE SIGNATURE | <org1.peer1 SIGNATURE>, <org2.peer1 SIGNATURE>, ... | |
| TX ID | 1 | |
| TIMESTAMP | 2021/12/02 00:00:00 | |

PREVIOUS BLOCK HASH VALUE — 27100
STATE HASH VALUE — 27200

27030

| BLOCK 27410 | |
|---|---|
| DEPLOY TRANSACTION | |
| CONTRACT ID | SC2 |
| CONTRACT INPUT SPECIFICATION | REMITTANCE(...), ... |
| CONTRACT LOGIC | <BINARY> |
| TX APPROVAL CONDITION | THREE ORGANIZATIONS OR MORE |
| ... | ... |
| TX ID | 2 |
| TIMESTAMP | 2021/12/0 2 01:00:00 |

PREVIOUS BLOCK HASH VALUE — 27100
STATE HASH VALUE — 27200

27040

| BLOCK 27500 | |
|---|---|
| EXECUTION TRANSACTION | |
| CONTRACT ID | SC1 |
| CALLING FUNCTION + INPUT ARGUMENT | REMITTANCE (org1, org3, 100) |
| CLIENT USER SIGNATURE | <org1.user1 SIGNATURE> |
| DISTRIBUTED LEDGER NODE SIGNATURE | <org1.peer1 SIGNATURE>, <org2.peer1 SIGNATURE>, ... |
| TX ID | 3 |
| TIMESTAMP | 2021/12/03 00:00:00 |

PREVIOUS BLOCK HASH VALUE — 27100
STATE HASH VALUE — 27200

BLOCK

PREVIOUS BLOCK HASH VALUE

STATE INFORMATION

GATEWAY CONFIGURATION INFORMATION

| NODE NAME | ORGANIZATION ID |
|-----------|-----------------|
| org1.peer1 | org1 |
| org1.peer2 | org1 |
| org2.peer1 | org2 |
| org2.peer2 | org2 |
| . . . | . . . |

FIG. 6

REQUEST HISTORY INFORMATION

| ISSUING DATE AND TIME | CONTRACT ID | CALLING FUNCTION | CLIENT NODE SIGNATURE |
|---|---|---|---|
| 2021/12/03 00:00:00 | SC1 | REMITTANCE | <org1.user1 SIGNATURE> |
| 2021/12/03 01:00:00 | SC1 | REMITTANCE | <org1.user1 SIGNATURE> |
| . . . | . . . | . . . | . . . |

INTER-ORGANIZATIONAL DISTRIBUTION POLICY

| ORGANIZATION TYPE | SCORE |
|---|---|
| normal | 2 |
| auditor | 1 |
| . . . | . . . |

28010   28020   28000

FIG. 8
SC WEIGHTING POLICY 28110                                    28120   28100

| TX APPROVAL CONDITION | SCORE |
|---|---|
| TWO ORGANIZATIONS OR MORE | 2 |
| THREE ORGANIZATIONS OR MORE | 3 |
| FOUR ORGANIZATIONS OR MORE | 4 |
| FIVE ORGANIZATIONS OR MORE | 5 |
| . . . | . . . |

FIG. 9
TX RESTRICTION META-CONDITION 28210                    28220                    28230                                    28200

| ID | TX UPPER LIMIT CALCULATION FORMULA | META PAST TX CALCULATION FORMULA |
|---|---|---|
| 1 | 100 ÷ (SUM OF ORGANIZATION TYPE SCORES FOR ALL ORGANIZATIONS) x (ORGANIZATION TYPE SCORE OF ORGANIZATION) | VALUE OBTAINED BY SUMMING (NUMBER OF TXs IN PAST ONE MINUTE TO SPECIFIC SC OF ORGANIZATION x SCORE CORRESPONDING TO APPROVAL CONDITION OF SC) FOR ALL SCs |
| 2 | 70 | VALUE OBTAINED BY SUMMING (NUMBER OF TXs IN PAST ONE MINUTE TO SPECIFIC SC FOR ALL ORGANIZATIONS x SCORE CORRESPONDING TO APPROVAL CONDITION OF SC) FOR ALL SCs |
|  | . . . | . . . |

*FIG. 10*

TX RESTRICTION UPPER LIMIT 21610   21620            21630              21640                          21600

| ID | ORGANIZATION ID | TX UPPER LIMIT VALUE | PAST TX CALCULATION FORMULA |
|---|---|---|---|
| 1-1 | org1 | 66 | (NUMBER OF TXs IN PAST ONE MINUTE TO SC1 OF org1 x 2) + (NUMBER OF TXs IN PAST ONE MINUTE TO SC2 OF org1 x 3) |
| 1-2 | | 70 | (NUMBER OF TXs IN PAST ONE MINUTE TO SC1 FOR ALL ORGANIZATIONS x 2) + (NUMBER OF TXs IN PAST ONE MINUTE TO SC2 FOR ALL ORGANIZATIONS x 3) |
| 2-1 | org2 | 33 | (NUMBER OF TXs IN PAST ONE MINUTE TO SC1 OF org2 x 2) + (NUMBER OF TXs IN PAST ONE MINUTE TO SC2 OF org2 x 3) |
| 2-2 | | 70 | (NUMBER OF TXs IN PAST ONE MINUTE TO SC1 FOR ALL ORGANIZATIONS x 2) + (NUMBER OF TXs IN PAST ONE MINUTE TO SC2 FOR ALL ORGANIZATIONS x 3) |
| | . . . | . . . | . . . |
| 11-1 | org11 | 66 | (NUMBER OF TXs IN PAST ONE MINUTE TO SC1 OF org1 x 2) + (NUMBER OF TXs IN PAST ONE MINUTE TO SC2 OF org1 x 3) |
| 11-2 | | 70 | (NUMBER OF TXs IN PAST ONE MINUTE TO SC1 FOR ALL ORGANIZATIONS x 2) + (NUMBER OF TXs IN PAST ONE MINUTE TO SC2 FOR ALL ORGANIZATIONS x 3) |
| | . . . | . . . | . . . |

FIG. 12

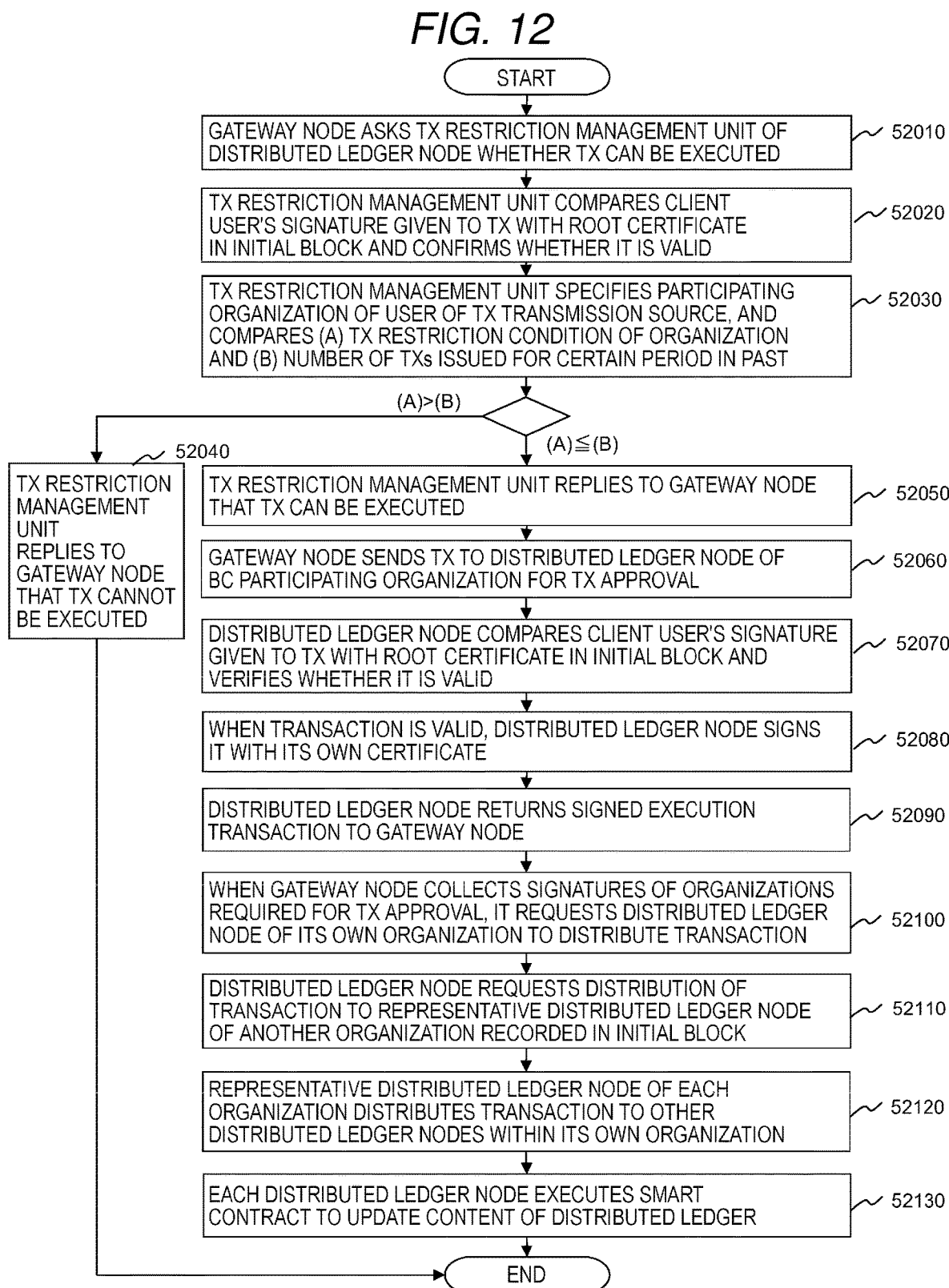

START

GATEWAY NODE ASKS TX RESTRICTION MANAGEMENT UNIT OF DISTRIBUTED LEDGER NODE WHETHER TX CAN BE EXECUTED  ~ 52010

TX RESTRICTION MANAGEMENT UNIT COMPARES CLIENT USER'S SIGNATURE GIVEN TO TX WITH ROOT CERTIFICATE IN INITIAL BLOCK AND CONFIRMS WHETHER IT IS VALID  ~ 52020

TX RESTRICTION MANAGEMENT UNIT SPECIFIES PARTICIPATING ORGANIZATION OF USER OF TX TRANSMISSION SOURCE, AND COMPARES (A) TX RESTRICTION CONDITION OF ORGANIZATION AND (B) NUMBER OF TXs ISSUED FOR CERTAIN PERIOD IN PAST  ~ 52030

(A)>(B)

(A)≦(B)

~ 52040

TX RESTRICTION MANAGEMENT UNIT REPLIES TO GATEWAY NODE THAT TX CANNOT BE EXECUTED

TX RESTRICTION MANAGEMENT UNIT REPLIES TO GATEWAY NODE THAT TX CAN BE EXECUTED  ~ 52050

GATEWAY NODE SENDS TX TO DISTRIBUTED LEDGER NODE OF BC PARTICIPATING ORGANIZATION FOR TX APPROVAL  ~ 52060

DISTRIBUTED LEDGER NODE COMPARES CLIENT USER'S SIGNATURE GIVEN TO TX WITH ROOT CERTIFICATE IN INITIAL BLOCK AND VERIFIES WHETHER IT IS VALID  ~ 52070

WHEN TRANSACTION IS VALID, DISTRIBUTED LEDGER NODE SIGNS IT WITH ITS OWN CERTIFICATE  ~ 52080

DISTRIBUTED LEDGER NODE RETURNS SIGNED EXECUTION TRANSACTION TO GATEWAY NODE  ~ 52090

WHEN GATEWAY NODE COLLECTS SIGNATURES OF ORGANIZATIONS REQUIRED FOR TX APPROVAL, IT REQUESTS DISTRIBUTED LEDGER NODE OF ITS OWN ORGANIZATION TO DISTRIBUTE TRANSACTION  ~ 52100

DISTRIBUTED LEDGER NODE REQUESTS DISTRIBUTION OF TRANSACTION TO REPRESENTATIVE DISTRIBUTED LEDGER NODE OF ANOTHER ORGANIZATION RECORDED IN INITIAL BLOCK  ~ 52110

REPRESENTATIVE DISTRIBUTED LEDGER NODE OF EACH ORGANIZATION DISTRIBUTES TRANSACTION TO OTHER DISTRIBUTED LEDGER NODES WITHIN ITS OWN ORGANIZATION  ~ 52120

EACH DISTRIBUTED LEDGER NODE EXECUTES SMART CONTRACT TO UPDATE CONTENT OF DISTRIBUTED LEDGER  ~ 52130

END

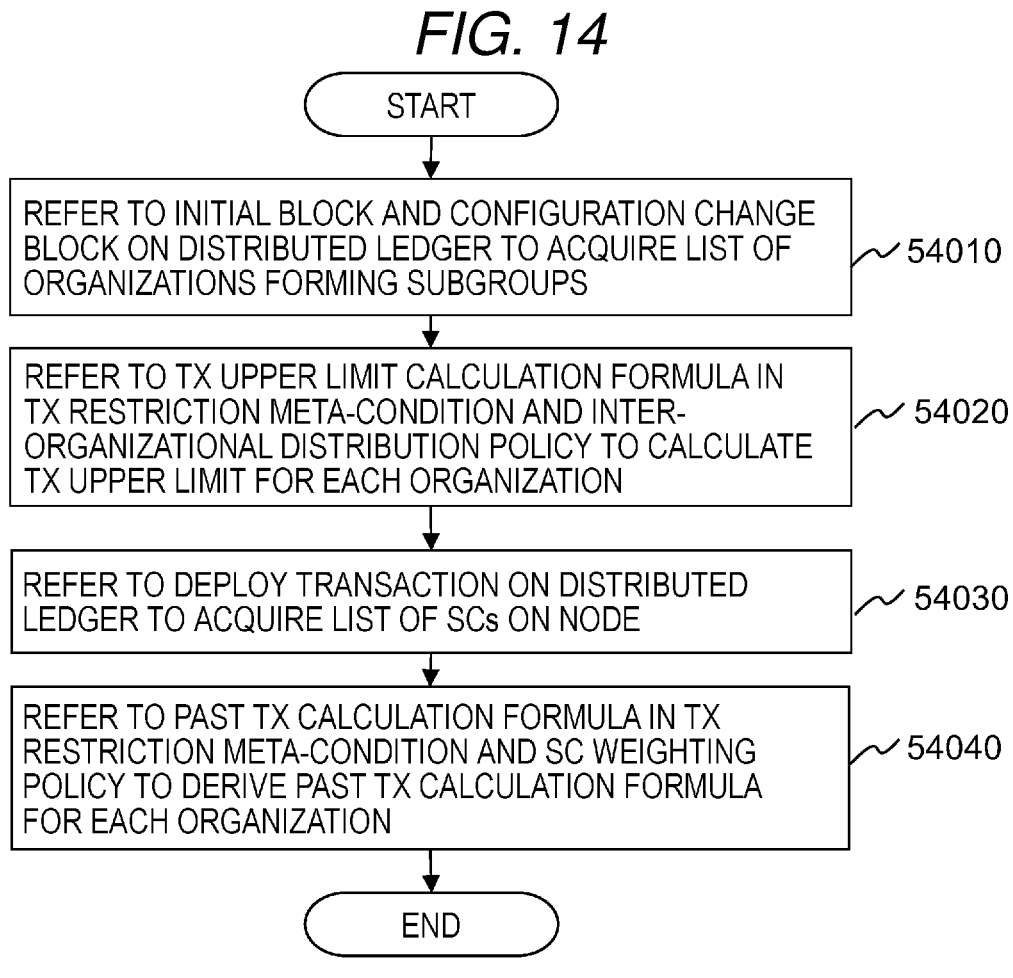

*FIG. 14*

START

REFER TO INITIAL BLOCK AND CONFIGURATION CHANGE BLOCK ON DISTRIBUTED LEDGER TO ACQUIRE LIST OF ORGANIZATIONS FORMING SUBGROUPS    54010

REFER TO TX UPPER LIMIT CALCULATION FORMULA IN TX RESTRICTION META-CONDITION AND INTER-ORGANIZATIONAL DISTRIBUTION POLICY TO CALCULATE TX UPPER LIMIT FOR EACH ORGANIZATION    54020

REFER TO DEPLOY TRANSACTION ON DISTRIBUTED LEDGER TO ACQUIRE LIST OF SCs ON NODE    54030

REFER TO PAST TX CALCULATION FORMULA IN TX RESTRICTION META-CONDITION AND SC WEIGHTING POLICY TO DERIVE PAST TX CALCULATION FORMULA FOR EACH ORGANIZATION    54040

END

| INITIAL BLOCK 27300 | |
| --- | --- |
| SUBGROUP ID | Group1 |
| PARTICIPATING ORGANIZATION ID AND ATTRIBUTE | org1:normal, org2:auditor, ... |
| PARTICIPATING ORGANIZATION ROOT CERTIFICATE | <org1 CERTIFICATE>, <org2 CERTIFICATE>, ... |
| PARTICIPATING ORGANIZATION REPRESENTATIVE NODE | org1.peer1, org2.peer1, ... |
| TIMESTAMP | 2021/12/01 00:00:00 |

27020

| BLOCK 27400 | |
| --- | --- |
| DEPLOY TRANSACTION | |
| CONTRACT ID | SC0 |
| CONTRACT INPUT SPECIFICATION (FUNCTION NAME + ARGUMENT) | TX UPPER LIMIT CALCULATION() |
| CONTRACT LOGIC | <BINARY> |
| | INTER-ORGANIZATIONAL DISTRIBUTION POLICY 28000 |
| | SC WEIGHTING POLICY 28100 |
| | TX RESTRICTION META-CONDITION 28200 |
| TX APPROVAL CONDITION | ONE ORGANIZATIONS OR MORE |
| CLIENT NODE SIGNATURE | <org1.user1 SIGNATURE> |
| DISTRIBUTED LEDGER NODE SIGNATURE | <org1.peer1 SIGNATURE>, <org2.peer1 SIGNATURE>, ... |
| TX ID | 1 |
| TIMESTAMP | 2021/12/02 00:00:00 |

| PREVIOUS BLOCK HASH VALUE | 27100 |
| STATE HASH VALUE | 27200 |

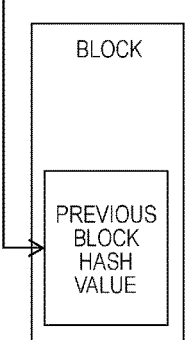

BLOCK

PREVIOUS BLOCK HASH VALUE

TRANSACTION MANAGEMENT SYSTEM AND TRANSACTION MANAGEMENT METHOD

CROSS-REFERENCE TO RELATED APPLICATION

This application claims priority pursuant to Japanese patent application No. 2022-067734, filed on Apr. 15, 2022, the entire disclosure of which is incorporated herein by reference.

BACKGROUND OF THE INVENTION

1. Field of the Invention

The present invention relates to a transaction management system and a transaction management method.

2. Description of Related Art

Distributed ledger technology using a block chain (hereinafter, also referred to as BC) has emerged as a technology that replaces a transaction that has traditionally been carried out via a reliable centralized institution such as a financial institution and a government with a direct transaction by Peer to Peer (P2P) between users.

Various derivative technologies have been proposed for distributed ledger technology, and they continue to evolve. Main features of a current situation include (1) in a transaction between participants in a distributed ledger, the transaction is finalized through consensus building and approval by (any or specific) participants rather than by a centralized institution, (2) collecting a plurality of transactions as a block, recording them in a distributed ledger called a block chain in a daisy chain, and performing hash calculation on consecutive blocks to make tempering virtually not possible, and (3) enabling all participants to confirm transactions by sharing the same ledger data.

From the features described above, such distributed ledger technology using BC is being considered for application in a wide range of fields, such as finance and manufacturing, as a mechanism for managing/sharing reliable data and executing/managing a transaction based on a contract.

By using a platform (hereinafter, distributed ledger platform) that provides a distributed ledger, it is possible to share information and conduct a transaction among a plurality of entities without being managed by a centralized institution (for example, a consortium in a specific industry or a plurality of companies involved in a supply chain).

A block chain or a distributed ledger in which only a computer authorized by a specific organization becomes a participant in a transaction is called a "consortium type". In this consortium type, there is a management entity that authenticates a participant. Therefore, there is an advantage in that speed of transaction approval can be increased.

Based on the advantage, when distributed ledger technology is used within a consortium in a specific industry, a consortium-type distributed ledger platform is generally used.

Further, in some distributed ledger platforms, it is becoming possible to manage not only transaction data but also logic that describes a transaction condition in distributed ledgers, in order to be able to handle complex transaction conditions and diverse applications. This logic is called a smart contract (hereinafter, also referred to as SC). Non-Patent Literature 1 "Hyperledger Fabric", [online],

[searched on Dec. 1, 2021], Internet <URL: http://hyperledger-fabric.readthedocs.io/en/latest/>discloses technology related to a distributed ledger platform having the SC execution function described above.

On the distributed ledger platform, information (ledger) is shared on a plurality of nodes by accepting a transaction (hereinafter, also referred to as TX) while building consensus at a predetermined consensus level among nodes forming the distributed ledger platform, executing the TX at each node, and storing a result of the TX. It also has an SC execution function that executes a predetermined logic for the TX.

Attempts have also been made to improve efficiency of a business process by using a consortium-type BC for an inter-organizational cross work. In this case, a ledger that stores a transaction history of all organizations participating in the BC will be shared among the organizations, which is not necessarily preferable from a viewpoint of maintaining confidentiality of each company. Therefore, it is conceivable that a ledger is shared only by organizations that have a predetermined transaction relationship.

Therefore, Non-Patent Literature 1 discloses a concept called "Channel" that logically divides a distributed ledger in response to such a case.

The distributed ledger platform in this case is a single distributed ledger platform in which all organizations participate, but is internally logically divided into a plurality of distributed ledger platforms. A set of nodes belonging to this logically divided distributed ledger platform is hereinafter referred to as a "subgroup".

Nodes belonging to the subgroup described above share the distributed ledger only with the nodes in the subgroup, and when executing the TX, execute the SC installed for each subsystem, and update data of the distributed ledger linked to each subgroup.

As described above, the consortium-type BC requires that only computers authorized by a specific organization can participate in transactions. In the distributed ledger platform technology described in Non-Patent Literature 1, client users who participate in transactions and nodes that form a BC each hold their own digital certificates in order to clarify their affiliated organization and authority.

A digital certificate is issued by a certification authority owned by each organization and digitally signed by the certification authority. In addition, a public key of the certification authority itself has been distributed to all organizations in advance, and by using it to verify a signature written on the certificate, validity of the certificate of a client user and a BC participating node can be confirmed.

In a recent year, a plurality of cloud vendors are emerging that provide consortium-type BCs in a form of Platform as a Service (PaaS). Such services are called managed-type block chain services (BC services).

In the BC service, in order to reduce a customer's construction workload, while acting on behalf of construction and operation of distributed ledger nodes and certificate authorities, it is common for a customer side to construct a server equipped with a business application that accesses the distributed ledger.

US20190102423A1 describes a configuration example of a typical BC service. In US20190102423A1, a plurality of gateway nodes and load balancers are installed between a consortium-type BC and an application server.

The gateway node holds configuration information of the distributed ledger nodes that form the BC, and performs a process such as consensus building and approval of the TX in response to a request from the business application. A load balancer distributes a processing load so that processing requests from the business application server are not biased toward a specific gateway node.

In a BC service based on the existing technology disclosed in Non-Patent Literature 1 or the like, a plurality of organizations share the same computer resource. Therefore, behavior of each organization can adversely affect work of other organizations. In particular, in a consortium-type BC, due to nature of all organizations sharing the same ledger, the number of times the ledger can be accessed per unit time tends to be constant regardless of the number of participating organizations.

Therefore, when a specific organization is accessed beyond its capacity, a load becomes excessive, and other organizations may not be able to access.

SUMMARY OF THE INVENTION

An object of the present invention is to provide a technology that makes it possible to appropriately share resources among participating organizations in a BC service and to maintain favorable reliability of the BC service.

A transaction management system of the present invention that solves the problem described above is a distributed ledger system in which a business network is formed of a plurality of nodes, where the node calculates an upper limit of the number of transactions that can be issued by each of a plurality of organizations according to a calculation rule shared among the nodes, and refuses to accept the transaction from an organization of the organizations of which the number of transactions in past exceeds the upper limit of the number of transactions.

There is provided a transaction management method of the present invention, where in a distributed ledger system in which a business network is formed of a plurality of nodes, the node calculates an upper limit of the number of transactions that can be issued by each of a plurality of organizations according to a calculation rule shared among the nodes, and refuses to accept the transaction from an organization of the organizations of which the number of transactions in past exceeds the upper limit of the number of transactions.

According to the present invention, it is possible to properly maintain reliability of a BC service by appropriately sharing resources among participating organizations in the BC service.

BRIEF DESCRIPTION OF THE DRAWINGS

FIG. 2 is a diagram illustrating a configuration example of a block chain included in a distributed ledger of a distributed ledger node in the present embodiment;

FIG. 6 is a diagram illustrating a configuration example of request history information possessed by the load balancer in the present embodiment;

FIG. 7 is a diagram illustrating a configuration example of an inter-organizational distribution policy included in a TX restriction condition formulation logic in an initial block in the present embodiment;

FIG. 8 is a diagram illustrating a configuration example of an SC weighting policy included in the TX restriction condition formulation logic in the initial block in the present embodiment;

FIG. 9 is a diagram illustrating a configuration example of a TX restriction meta-condition included in the TX restriction condition formulation logic in the initial block in the present embodiment;

FIG. 10 is a diagram illustrating a configuration example of a TX restriction upper limit provided by the distributed ledger node in the present embodiment;

FIG. 12 is a flowchart illustrating an example of overall flow of transaction execution processing executed by the distributed ledger node in the present embodiment;

FIG. 14 is a flowchart illustrating an example of overall flow of the TX restriction condition formulation logic provided in the initial block in the present embodiment;

FIG. 16 is a diagram illustrating a configuration example of a block chain included in a distributed ledger of a distributed ledger node in the present embodiment.

DESCRIPTION OF EMBODIMENTS

<Network Configuration>

Figure 1:
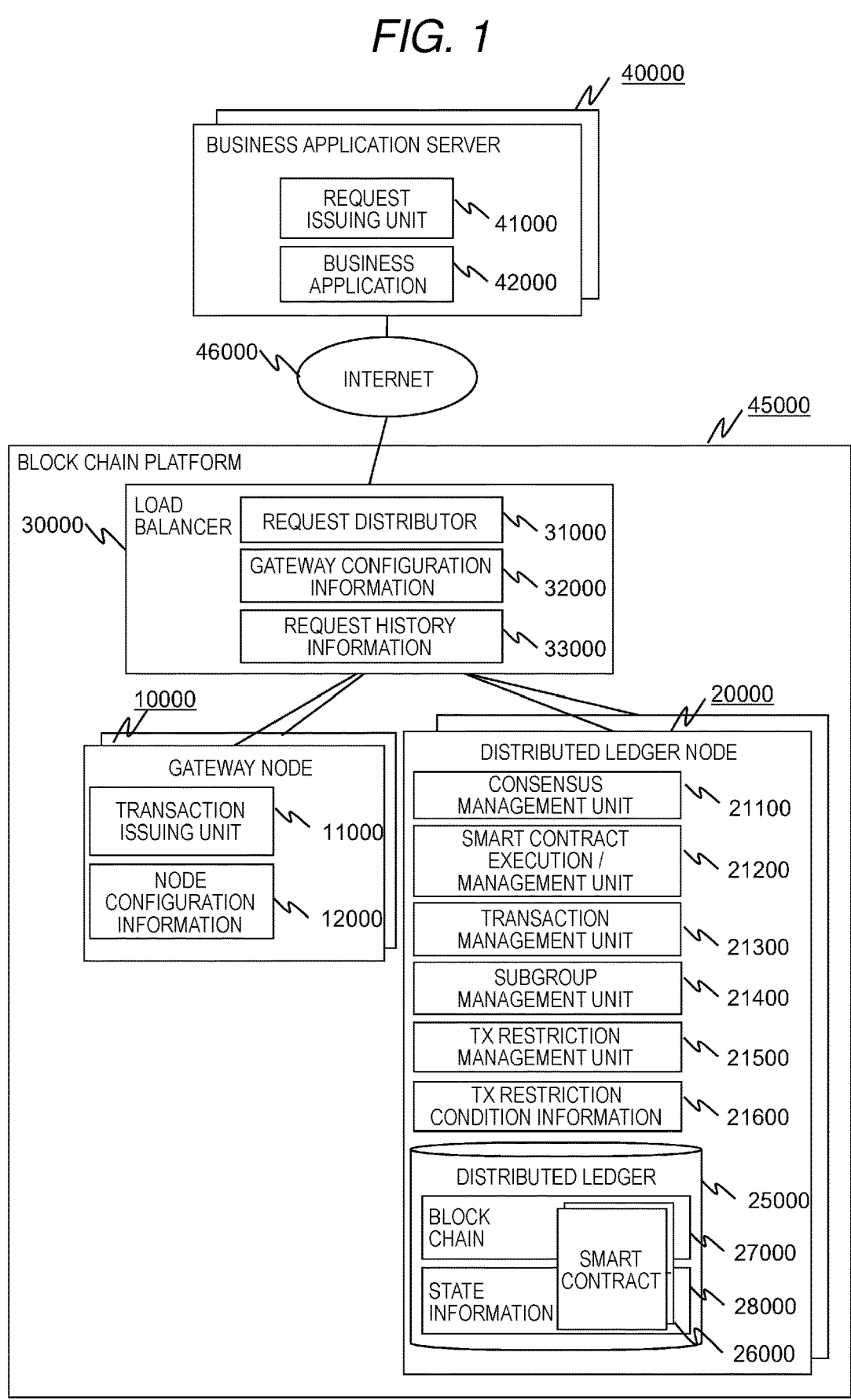
FIG. 1 is a diagram illustrating a configuration example of a computer system including a transaction management system of a present embodiment.

Embodiments of the present invention will be described in detail below with reference to the drawings. FIG. 1 is a diagram illustrating a network configuration example of a computer system including a block chain platform 45000 (that is, a transaction management system) of the present embodiment. The block chain platform 45000 illustrated in FIG. 1 is a distributed ledger system that makes it possible to properly share resources between participating organizations in a BC service and maintain reliability of the BC service.

A computer system illustrated in FIG. 1 is formed of a business application server 40000 and the block chain platform 45000.

Among them, the business application server 40000 is formed of a request issuing unit 41000 and a business application 42000. The business application 42000 is an application that receives and processes a request related to transactions defined on SC from a client user who has accessed the business application server 40000 with a terminal.

This business application transmits contents input by the client user to a load balancer 30000 of the block chain platform 45000 via an Internet 46000 via the request issuing unit.

The load balancer 30000 distributes a request including the above-described input contents to a gateway node 10000. In addition, the gateway node 10000 receiving this request issues transaction (TX) by a transaction issuing unit 11000 and distributes it to a distributed ledger node 20000.

As issuer information given to the TX described above, an organization ID that uniquely specifies an organization that is an issuer and authentication information (private key) issued for each client user are used. When issuing a TX, the client user signs the TX using his or her private key and sends the TX together with a certificate. The certificate and private key have been previously issued by a certificate authority of a client user's organization.

Also, the block chain platform 45000 is formed of one or more gateway nodes 10000 and one or more distributed ledger nodes 20000 in addition to the load balancer 30000 described above.

These devices are interconnected through physical or logical communication lines. The block chain platform 45000 is connected with one or more business application servers 40000 via the load balancer 30000 and the Internet 46000.

The present embodiment assumes a configuration in which a plurality of distributed ledger nodes 20000 exist. These distributed ledger nodes 20000 are respectively managed by a plurality of organizations (for example, a plurality of operators/a plurality of organizations/a plurality of vendors) forming a consortium.

A plurality of distributed ledger nodes 20000 may exist within one organization. In this case, a plurality of distributed ledger nodes 20000 will coexist while sharing the same information, making it easy to ensure redundancy in the event of a failure.

Similarly, it is assumed that a plurality of gateway nodes 10000 and business application servers 40000 exist, and a plurality of organizations use each gateway node and business application server individually. Also, in the present embodiment, the gateway node 10000 and the distributed ledger node 20000 are described as separate devices, but they may be integrated nodes.

A physical entity of the business application server 40000, the distributed ledger node 20000, and the gateway node 10000 is a general computer formed of a processor, a memory, a communication unit, and a data bus connecting between them.

In a hardware configuration of the computer, the memory is formed of an appropriate non-volatile storage element such as a solid state drive (SSD) and a hard disk drive, or a volatile storage element such as a random access memory (RAM). In addition to a program for implementing necessary functions, such memories also store various data used by the program for calculations.

The processor is a CPU that reads out and executes the programs stored in the above-described memory, performs overall control of the computer itself, and performs various determinations, calculations, and control processes.

Also, a communication device unit is a network interface card or the like that connects to an appropriate network such as the Internet 46000 and performs communication processing with other devices.

The gateway node 10000 illustrated in FIG. 1 is formed of the transaction issuing unit 11000 and node configuration information 12000.

Also, the distributed ledger node 20000 is formed of a consensus management unit 21100, a smart contract execution/management unit 21200 (hereinafter, also referred to as SC execution/management unit), a transaction management unit 21300, a subgroup management unit 21400, a TX restriction management unit 21500, TX restriction condition information 21600, and a distributed ledger 25000.

The distributed ledger 25000 is defined for each subgroup, and the same ledger is shared between nodes belonging to the subgroup.

The distributed ledger node 20000 accepts a TX from the gateway node 10000 by a function of the transaction management unit 21300, and the distributed ledger node 20000 uses a function of the consensus management unit 21100 to form a consensus with other distributed ledger nodes 20000 as to whether the TX may be accepted.

In addition, the distributed ledger node 20000 deploys the SC and executes the deployed SC via a function of the SC execution/management unit 21200 when consensus is formed regarding the TX described above. The distributed ledger node 20000 records the TX history and its execution result in the distributed ledger 25000.

Also, the transaction management unit 21300 of the distributed ledger node 20000 receives a TX in response to a request from each node such as the gateway node 10000, and provides a function/interface for acquiring and browsing the history information of the TX.

In the distributed ledger system, that is, the block chain platform 45000 in the present embodiment, members participating in the consortium, that is, organizations (and their distributed ledger nodes 20000) are managed by the distributed ledger 25000 held by the distributed ledger node 20000 of each organization.

Also, the subgroup management unit 21400 of the distributed ledger node 20000 provides new registration and addition functions for the above-described organizations and subgroups.

Also, in the block chain platform 45000 of the present embodiment, it is assumed that a pair of a private key and a public key is used to authenticate a participating organization, sign a TX, control SC execution authority, and the like.

Therefore, private key information of each distributed ledger node 20000 is stored and managed in the transaction management unit 21300 of the distributed ledger node 20000. On the other hand, public key information is shared among all distributed ledger nodes 20000.

Whenever the transaction management unit 21300 of the distributed ledger node 20000 receives a TX, it confirms whether an issuer of the TX is an authorized and correct participant. Well-known techniques can be applied to a method of generating a pair of a public key and a private key and a method of verifying a signature, so description thereof will be omitted.

A distributed ledger 25000 owned by the distributed ledger node 20000 stores and manages a smart contract 26000 related to business and a TX result by this smart contract (SC). As for the data structure of the TX result, it is assumed that the history of a TX is stored as a block chain 27000 and state information 28000 based on an execution result of the TX is stored in a table format.

In the block chain platform 45000 of the present embodiment, members participating in the consortium, that is, the organizations, and distributed ledger nodes are managed by the distributed ledger 25000 of each organization. Also, the subgroup management unit 21400 provides new registration and addition functions for organizations and subgroups.

Also, in the block chain platform 45000 of the present embodiment, it is assumed that authentication of participating organizations, signing of the TX, control of SC execution authority, and the like are performed using private keys and certificates. Information on the certificate and private key unique to each distributed ledger node 20000 is stored and managed in participating member management information 29000 of the distributed ledger node 20000. On the other hand, root certificate information of each organization is shared among all distributed ledger nodes.

The distributed ledger 25000 stores and manages the smart contract 26000 related to business and the TX result by the SC. As a data structure of the TX result, in the present example, it is assumed that the history of TX is set as the block chain 27000 and the state information 28000 based on the execution result of the TX is held in a table format.

On the other hand, the load balancer 30000 is formed of a request distributor 31000, gateway configuration information 32000, and request history information 33000. Among these, the gateway configuration information 32000 holds a list of gateway nodes 10000 in the block chain platform 45000 and information on access destinations.

Also, when the load balancer 30000 receives information input from the business application 42000, it refers to the gateway configuration information 32000 and transfers it to the gateway node 10000 in round robin. In this case, the input information and the execution result are stored in the request history information 33000.

Data Structure Example

Figure 3:
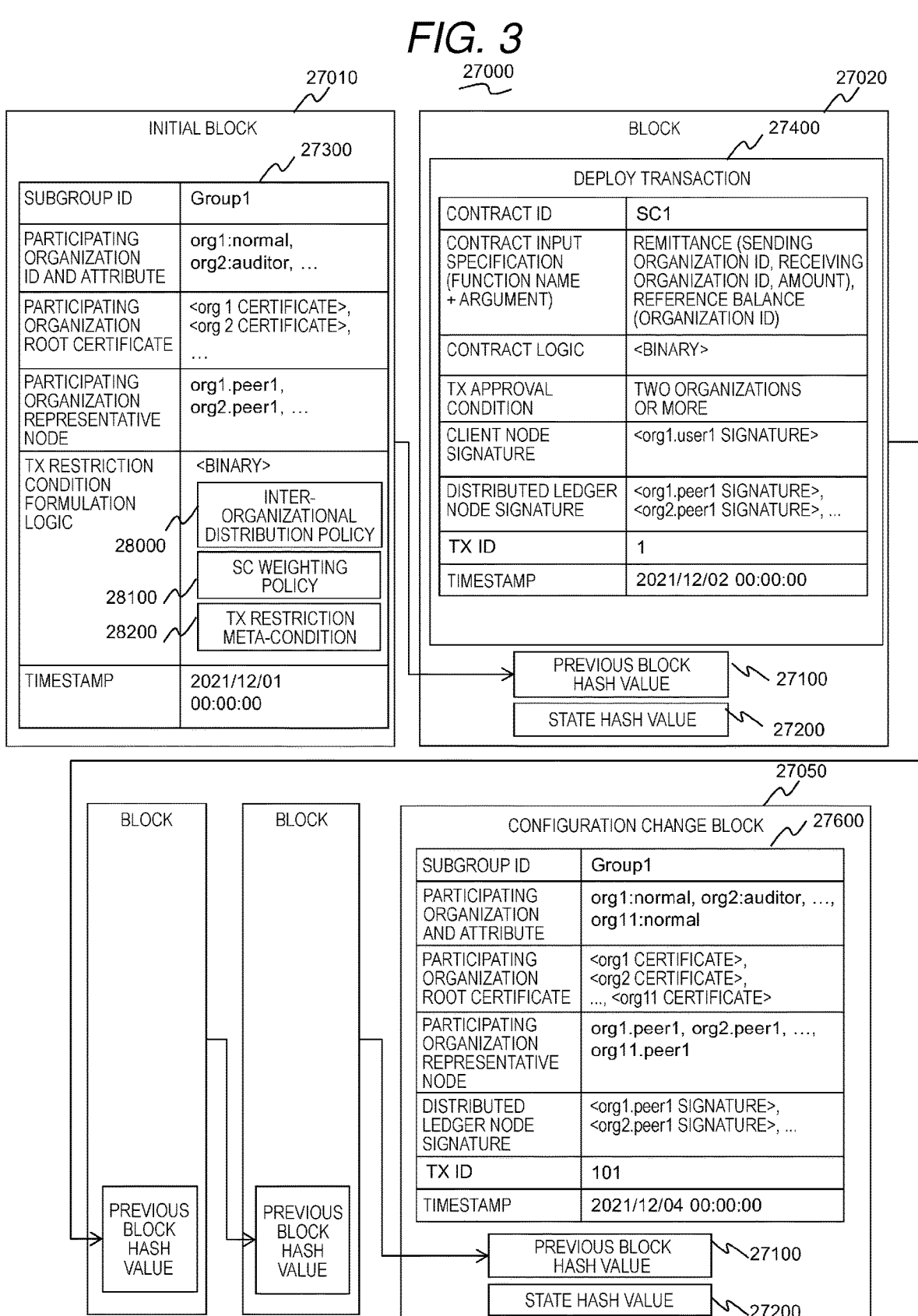
FIG. 3 is a diagram illustrating the configuration example of the block chain included in the distributed ledger of the distributed ledger node in the present embodiment.
Figures 4, 5:
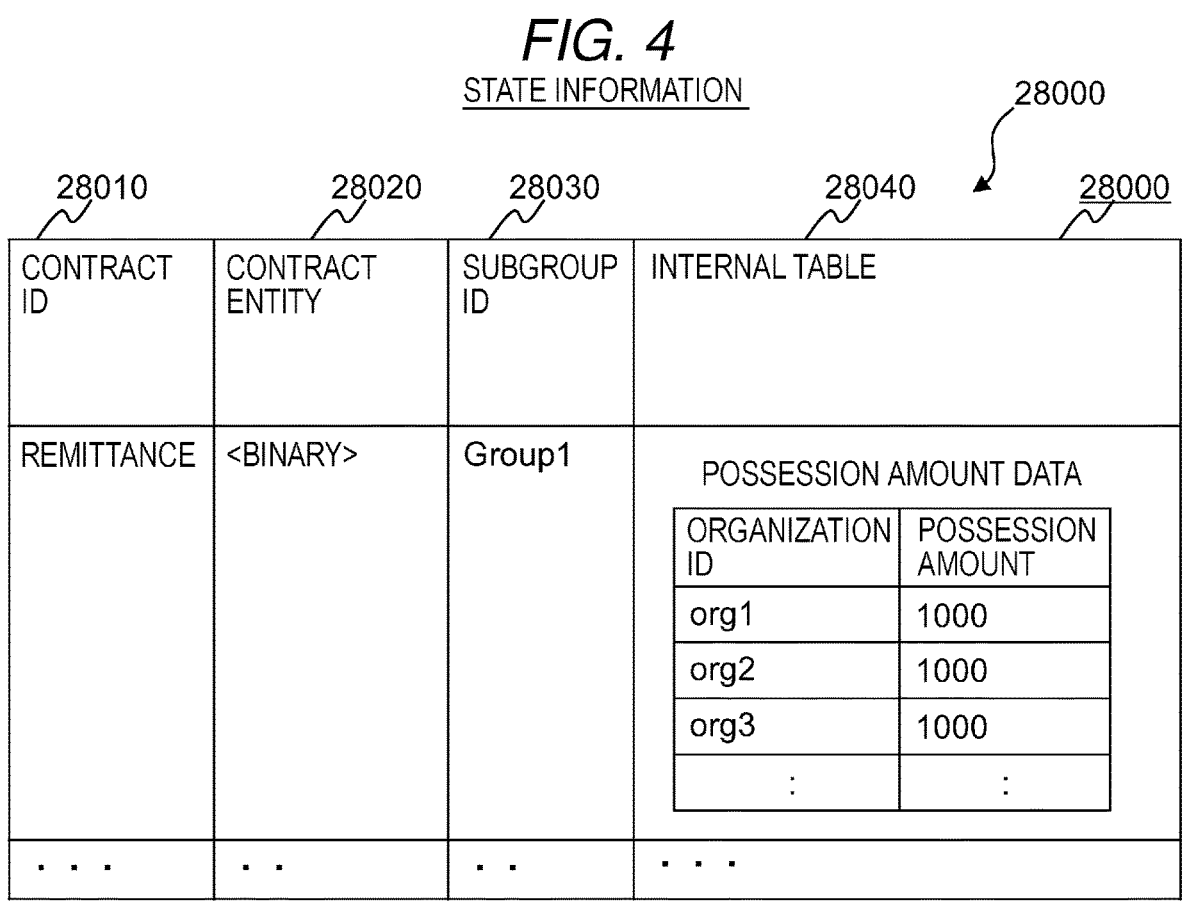
FIG. 4 is a diagram illustrating a configuration example of state information included in the distributed ledger of the distributed ledger node in the present embodiment.
FIG. 5 is a diagram illustrating a configuration example of gateway configuration information possessed by a load balancer in the present embodiment.

FIGS. 2, 3, and 4 are examples of data structures stored in the distributed ledger 25000 possessed by the distributed ledger node 20000.

FIG. 2 is an example of the block chain 27000, which is one of the data structures managed by the distributed ledger 25000. In distributed ledger management using the BC, a plurality of TXs are grouped as a block, and each block has a hash value of a previous block to manage data in a daisy chain. When even one bit of the value of the previous block changes, the hash values of all subsequent blocks change, making tempering difficult.

In the present example, one TX is assumed to be one block for the sake of simplicity of explanation, but the present invention can also be applied to a case where a plurality of TXs are collectively stored in one block.

A series of blocks 27010 to 27030 in such a BC 27000 is illustrated in FIG. 2. Each of blocks 27020 to 27040, except for an initial block 27010 that stores initial information for subgroups, which will be described below, includes SC deployment, execution, and any pieces of TX information.

Also, each block 27020 to 27040 includes a hash value 27100 of the previous block and a hash value 27200 generated from state information, which will be described below. With the above-described data structure, subgroup creation, SC deployment, and execution history information are managed as a chain of data in the BC.

The initial block 27010 is an example of a block that stores initial information of subgroups. In a TX 27300 of the initial block 27010 in the present embodiment, an ID of the subgroup associated with the distributed ledger 25000 is defined. Further, the IDs and attributes of the organizations belonging to the subgroup, a list of root certificates, and the name of the distributed ledger node 20000 representing each organization are defined. In addition, it includes TX restriction condition formulation logic (for example, an executable binary), described below, and a timestamp indicating the time at which the block was created.

Also, the blocks 27020 and 27030 are examples of blocks that store the deploy TX of the SC. Among these, a deploy TX 27400 includes a contract ID that uniquely identifies the contract, a logic (for example, an executable binary) of the contract, and a condition necessary to obtain transaction approval between participating organizations (the deploy TX 27410 has the same configuration, and the description thereof is omitted).

The deploy TX 27400 also includes a contract input specification for the user to understand a function name and an argument of the contract. In this example, "remittance" and "reference balance" are defined as function names of the SC having an ID of "SC1", and the logic of the function is also defined.

In addition, this deploy TX 27400 includes a signature of a client user that issued it and an electronic signature of the distributed ledger node 20000 that has agreed to execute this deploy TX 27400. It also includes an ID, which is a unique identifier for the TX, and a timestamp indicating the time at which the TX was issued.

Also, the block 27040 is an example of a block storing an execution TX 27500 of the SC. The execution TX 27500 in the present embodiment includes the contract ID of the contract to be called, the function name of the contract to be called, and the information of the input argument.

In this example, the SC function "remittance" with the ID "SC1" is called, and there are three arguments, a sending organization ID, a receiving organization ID, and an amount, and the values thereof are respectively "Org1", "Org3", and "100".

The execution TX 27500 also includes the signature of the client user of this TX and the electronic signature of the distributed ledger node that has agreed to execute this TX. It also includes an ID, which is a unique identifier for the TX, and a timestamp indicating the time at which the TX was issued. It also includes an ID, which is a unique identifier for the TX within the distributed ledger, and a timestamp indicating the time at which the TX was issued.

FIG. 3 is an example of the block chain 27000, which is one of the data structures managed by the distributed ledger 25000.

Among these, a configuration change block 27050 is an example of a block that stores configuration change information of a subgroup. A TX 27600 in the configuration change block 27050 of the present embodiment defines the IDs and attributes of organizations belonging to the subgroup after configuration change, a list of root certificates, and the names of distributed ledger nodes 25000 representing respective organizations. In addition, it includes an ID, which is a unique identifier for the TX, and a timestamp indicating the time at which the block was created. The configuration of the block chain illustrated in FIG. 3 is the same as the configuration in FIG. 2 except for the configuration change block 27600.

FIG. 4 illustrates state information 28000 managed by the distributed ledger 25000. Distributed ledger management using BC usually requires traversing the BC to obtain a latest state (for example, account balance in the case of virtual currency). Since this results in poor processing efficiency, there is a method of caching the latest state information other than BC (Non-Patent Literature 1 and the like).

The present embodiment also assumes that the latest state information 28000 is held. In the present embodiment, a state data area is prepared for each function of the SC 26000.

The state information 28000 holds an ID 28010 that is an identifier of the SC 26000, an entity 28020 of the SC 26000, and an identifier 28030 of the subgroup linked to the SC 26000.

As a result, the SC execution/management unit 21200 can acquire and execute the SC entity using the contract ID and function name as keys. Also, the state information 28000 includes an internal table 28040 for holding the execution result of the SC 26000. The SC execution/management unit 21200 updates the contents of this internal table 28040 every SC execution.

The internal table 28040 exemplified in FIG. 4 is formed of a table of "possession amount data", and information specified by the argument of TX is overwritten at any time.

FIG. 5 is a diagram illustrating a configuration example of the node configuration information 12000 that the gateway node 10000 has.

The node configuration information 12000 includes, as configuration items, a field 12010 for registering the name of the distributed ledger node 20000 to which TX is to be transmitted by the gateway node 10000, and a field 12020 for registering the ID of the organization to which the distributed ledger node 20000 belongs.

FIG. 6 is a diagram illustrating a configuration example of request history information 33000 that the load balancer 30000 has. The request history information 33000 is added when a request is made from the business application server 40000 to the load balancer 30000.

This request history information 33000 includes, as configuration items, a field 33010 for registering the date and time of occurrence of the request, a field 33020 for registering the ID of the SC 26000 to be executed by the request, a field 33030 for registering the name of the function in the SC 26000 called by the request, and a field 33040 for registering a client node signature given to the request.

FIG. 7 is a diagram illustrating a configuration example of an inter-organizational distribution policy 28000 included in the TX restriction condition formulation logic provided in the initial block 27300.

The inter-organizational distribution policy 28000 includes, as configuration items, a field 28010 for registering the organization type recorded together with the organization ID in the initial block 27300, and a field 28020 for registering a score assigned to the organization type.

FIG. 8 is a diagram illustrating a configuration example of an SC weighting policy 28100 included in a TX restriction condition formulation logic provided in the initial block 27300.

The SC weighting policy 28100 includes, as configuration items, a field 28110 for registering a TX approval condition of each SC 26000 registered in a deploy transaction 27400, and a field 28120 for registering the score given to the TX approval condition.

FIG. 9 is a diagram illustrating a configuration example of a TX restriction meta-condition 28200 included in the TX restriction condition formulation logic provided in the initial block 27300.

The TX restriction meta-condition 28200 includes, as configuration items, a field 28210 for registering an ID of a conditional statement that the TX restriction meta condition has, a field 28220 for registering a TX upper limit calculation formula, a field 28230 for registering a meta past TX calculation formula corresponding to the TX upper limit calculation formula.

FIG. 10 is a diagram illustrating a configuration example of the TX restriction condition information 21600 that the distributed ledger node 20000 has.

The TX restriction condition information 21600 includes, as configuration items, a field 21610 for registering the ID of the conditional statement that the TX restriction condition has, a field 21620 for registering an ID of an organization to which the conditional statement applies, a field 21630 for registering a TX upper limit value assigned to the organization, and a field 21640 for registering the past TX calculation formula corresponding to the TX upper limit value.

Flow Example 1

An actual procedure of a transaction management method according to the present embodiment will be described below with reference to the drawings. Various operations corresponding to the transaction management method described below are realized by programs read out to a memory and executed by each device forming the block chain platform 45000 (distributed ledger system), which is a transaction management system (the same applies hereinafter). This program is formed of codes for performing various operations described below.

Figure 11:
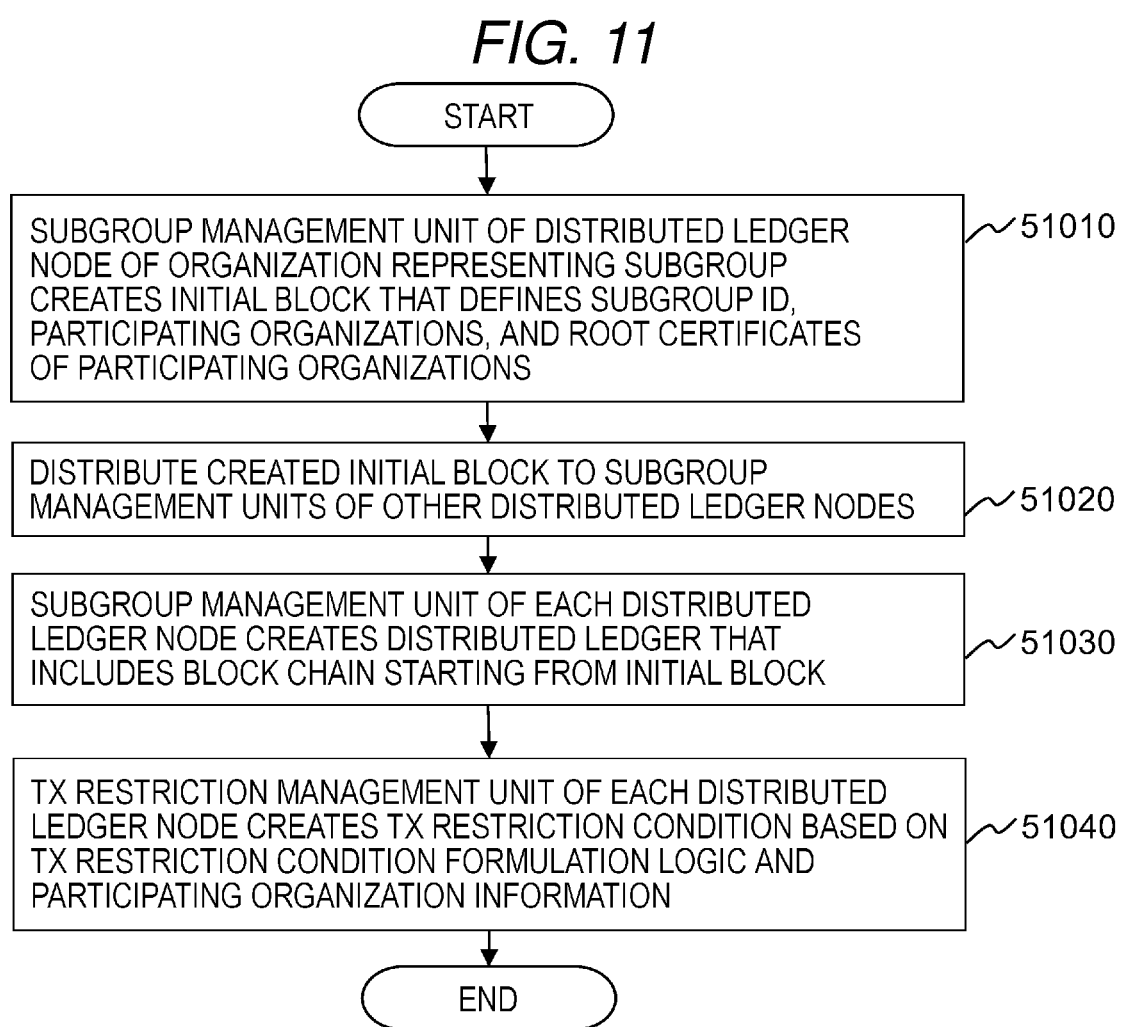
FIG. 11 is a flowchart illustrating an example of overall flow of new subgroup creation processing executed by the distributed ledger node in the present embodiment.

FIG. 11 is a flowchart illustrating an example of new subgroup creation processing of the subgroup management unit 21400 provided in the distributed ledger node 20000 of the present embodiment. Specific internal processing is described below.

When a plurality of organizations on the block chain try to create a new subgroup, an administrator of the BC service agrees with the participating organization in advance, determines a subgroup ID, a participating organization ID, a participating organization root certificate, a name of a representative node of the participating organization, and a TX restriction condition formulation logic, and inputs them to the subgroup management unit 21400 by operating a predetermined terminal.

On the other hand, the subgroup management unit 21400 of the distributed ledger node 20000 creates an initial block based on these pieces of information (step S1010).

Next, the subgroup management unit 21400 distributes the initial block created in the above steps to the subgroup management units 21400 of other distributed ledger nodes 20000 (step S1020).

The subgroup management unit 21400 of each organization that received the above distribution creates a distributed ledger 25000 that includes a block chain starting from the initial block (step S1030).

Finally, the TX restriction management unit 21500 in the distributed ledger node 2000 of each organization creates the TX restriction condition information 21600 based on the TX restriction condition formulation logic and participating organization information (step S1040). Details of a procedure for creating the TX restriction condition information will be described in FIG. 14.

Flow Example 2

FIG. 12 is a flowchart illustrating an example of TX execution processing of the distributed ledger node 20000, that is, an example of SC deployment and execution.

In this case, when the gateway node 10000 receives a request for a transaction defined on the SC from the business application 42000 via the load balancer 30000, the gateway node 10000 converts the request into a TX for the distributed ledger node 20000.

Then, the gateway node 10000 issues a TX to the TX restriction management unit 21500 of any one distributed ledger node 20000 in order to confirm whether the TX to be executed violates the TX restriction condition (step S2010). The contents of TX are the name of the SC to be executed, the name of the function, and the argument.

The TX restriction management unit 21500 compares the client user's signature given to the TX with the root certificate in the initial block, and confirms whether the user is valid (step S2020).

Next, the TX restriction management unit 21500 specifies a participating organization of the user of the TX transmission source, and then the TX restriction management unit 21500 refers to the TX restriction condition information 21600 and compares (A) the TX upper limit value of the organization and (B) the number of TXs issued for a certain period in the past calculated by a method defined in the past TX calculation formula (step S2030).

As a result of the above-described comparison, when (A)>(B), the TX restriction management unit 21500 replies to the gateway node 10000 that the TX cannot be executed (step S2040).

On the other hand, when (A) (B), the TX restriction management unit 21500 replies to the gateway node 10000 that the TX can be executed (step S2050).

When a plurality of sets of TX upper limit values and past TX calculation formulas applicable to the organization are defined, only when (A) (B) is satisfied for all sets, a reply to the effect that the TX can be executed shall be made.

When calculating the number of issued TXs for a certain period in the past by the method defined in the past TX calculation formula, the TX restriction management unit 21500 refers to an execution transaction 27500 on the BC 27000. Instead of the BC 27000, the request history information 33000 of the load balancer 30000 may be referred to.

The gateway node 10000 issues a transaction to the TX restriction management unit 21500 of the distributed ledger node 20000 of each participating organization in order to obtain approval necessary for TX execution (step S2060).

When the transaction management unit 21300 of the distributed ledger node 20000 receives the TX from the gateway node 10000, the transaction management unit 21300 compares the client user's signature given to the transaction and the certificate sent at the same time with the root certificate in the initial block to verify whether it is valid (step S2070).

As a result of the above-described verification, when the transaction is valid, the distributed ledger node 20000 signs the TX using its own private key (step S2080). Also, the distributed ledger node 20000 returns the signed TX to the gateway node 10000 (step S2090).

When gateway node 10000 receives the signed TX from each distributed ledger node 20000, the gateway node 10000 considers that consensus building is completed, and requests the transaction management unit 21300 of any one distributed ledger node 20000 to distribute the TX (step S2100).

The transaction management unit 21300 of the distributed ledger node 20000 that has received the above-described request transmits the TX to a transaction distribution unit 21000. The transaction distribution unit 21000 assigns an ID to the TX and requests a representative distributed ledger node 20000 of another organization recorded in the initial block to distribute the TX (step S2110).

The representative distributed ledger node 20000 of each organization refers to the participating member management information 29000 and distributes the TX to other distributed ledger nodes 20000 within its own organization (step S2120). The SC execution/management unit 22000 of each distributed ledger node 20000 that has received this TX registers the received TX in the distributed ledger 25000.

In this case, when the content of TX is related to the deployment of the SC 26000, the contract ID and contract entity are registered as state information 28000 of the distributed ledger 25000, and a block including this TX is added to an end of the block chain 27000.

When the content of TX relates to the execution of a function defined in the SC 26000, the SC 26000 having the contract ID specified in the TX is given the calling function and input argument specified in TX and executed. Then, based on the result, the content of the distributed ledger 25000 is updated. That is, based on the execution result, the state information 28000 regarding this SC 26000 is updated, and the execution TX is added as an end block of the block chain 27000 (step S2130).

In the present embodiment, the distributed ledger node 20000 performs broadcast processing in steps S2060 and S2070 described above, but this may be performed by another node dedicated to transaction distribution.

Flow Example 3

Figure 13:
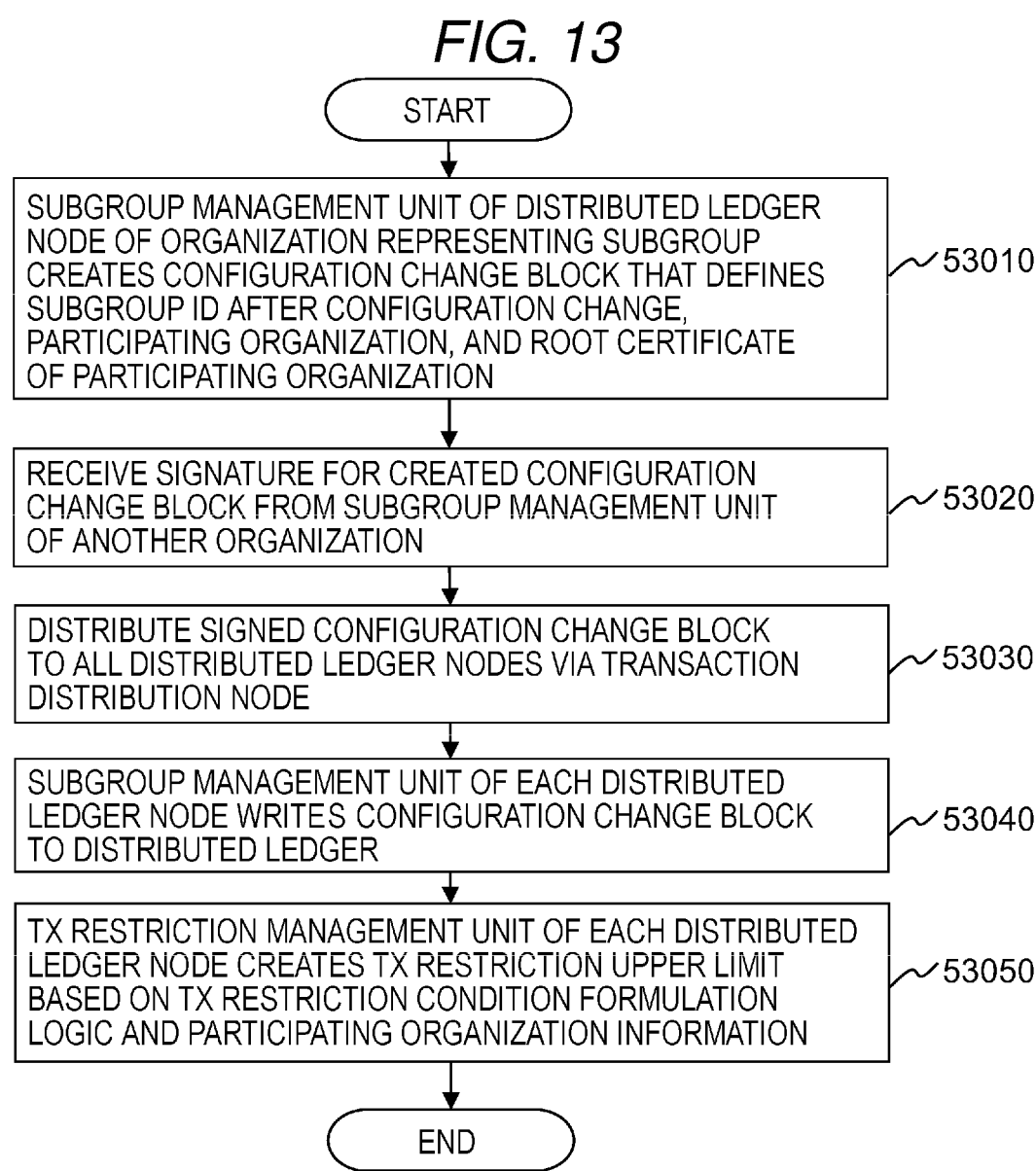
FIG. 13 is a flowchart illustrating an example of overall flow of subgroup configuration change processing executed by the distributed ledger node in the present embodiment.

FIG. 13 is a flowchart illustrating an example of subgroup configuration change processing of the subgroup management unit 21400 provided in the distributed ledger node 20000. Specific internal processing is described below.

When the administrator of the distributed ledger node 20000 of the organization representing the subgroup tries to add or remove an organization participating in the subgroup, the administrator operates a predetermined terminal to input the ID of each participating organization after changing the participating organization, the root certificate of each participating organization, and the name of the representative node of each participating organization to the subgroup management unit 21400.

When the subgroup management unit 21400 receives such input, it creates a configuration change block defining those pieces of information (step S3010).

Next, the subgroup management unit 21400 receives a signature for the configuration change block from the subgroup management unit 21400 of the distributed ledger node 20000 of another organization participating in the subgroup (step S3020).

Next, the subgroup management unit 21400 distributes the signed configuration change block to other distributed ledger nodes 20000 within the same subgroup (step S3030).

The subgroup management unit 21400 of each organization writes the above-described configuration change block to the BC 27000 (step S3040).

Finally, the TX restriction management unit 21500 of each distributed ledger node 20000 recreates a TX restriction condition information 21600 based on the TX restriction condition formulation logic and participating organization information (step S3050).

Flow Example 4

FIG. 14 is a flowchart illustrating an example of the TX restriction condition formulation logic in the initial block 27300. Specific internal processing is described below.

The TX restriction management unit 21500 refers to the initial block 27300 and configuration change block 27600 on the BC 27000 in the distributed ledger 25000, and acquires a list of organizations forming subgroups (step S4010).

Next, the TX restriction management unit 21500 refers to the TX upper limit calculation formula and the inter-organizational distribution policy in the TX restriction meta-condition 28200 to calculate the TX upper limit for each organization (step S4020).

Next, the TX restriction management unit 21500 refers to the deploy transaction 27400 on the distributed ledger 25000 and acquires the list of the SC 26000 on the node (step S4030).

Finally, the TX restriction management unit 21500 refers to the meta past TX calculation formula in the TX restriction meta-condition 28200 and the SC weighting policy to derive the past TX calculation formula for each organization (step S4040).

An example of data illustrated in the drawings will be described below. The TX restriction management unit refers to the initial block 27300 on the distributed ledger illustrated in FIG. 2, and specifies "org1" and "org2" as the organizations forming the subgroup. Next, the TX upper limit for each organization is calculated by referring to the TX upper limit calculation formula in the TX restriction meta-condition 28200 illustrated in FIG. 9, and then the TX upper limit is recorded in the TX upper limit value of the TX restriction condition information illustrated in FIG. 10.

Specifically, the organization types of "org1" and "org2" are respectively "normal" and "auditor", and their respective scores are "2" and "1" according to the inter-organizational distribution policy (FIG. 7). Therefore, the TX upper limit values indicated by ID1-1 and ID2-1 in FIG. 10 are calculated from the TX upper limit calculation formula indicated by ID1 in FIG. 9.

Next, the TX restriction management unit 21500 refers to the deploy block on the distributed ledger 25000 illustrated in FIG. 2, and specifies "SC1" and "SC2" as SCs that form the subgroups.

Next, the TX restriction management unit 21500 refers to the meta past TX calculation formula in the TX restriction meta-condition 28200 illustrated in FIG. 9 to calculate the past TX calculation formula for each organization, and then the TX restriction management unit 21500 calculates records in the meta past TX calculation formula of the TX restriction conditions illustrated in FIG. 10.

Specifically, the TX approval conditions for "SC1" and "SC2" are respectively "two organizations or more" and "three organizations or more", and according to the SC weighting policy (FIG. 8), the respective scores are "2" and "3". Therefore, the past TX calculation formulas indicated by ID1-1 and ID2-1 in FIG. 10 are calculated from the meta past TX calculation formula indicated by ID1 in FIG. 9.

Both the above described inter-organizational distribution policy and SC weighting policy do not necessarily have to be provided, and either one may be omitted.

The TX restriction management unit 21500 in step S2030 of FIG. 12 specifies the participating organization of a user of a TX transmission source, and then refers to the TX restriction condition information 21600 and compares (A) the TX upper limit value of the organization and (B) the number of TXs issued in the past certain period calculated by the method defined in the past TX calculation formula.

When the participating organization of the user of the TX transmission source is "org1" and the TX issuance time is "2021/12/03 00:00:30", according to the distributed ledger 25000 illustrated in FIG. 2, the TX in the past one minute is only once for "SC1", and the values calculated from the past TX calculation formulas indicated by ID1-1 and ID2-1 in FIG. 10 are each "2". Since both are below the TX upper limit value, the TX is allowed to execute.

In the example described above, the TX restriction management unit 21500 uniformly rejects the TX when the number of TXs issued during a certain past period exceeds the TX upper limit value. However, instead of uniformly rejecting the TX, a form may be adopted in which different TX upper limit values are determined among a plurality of SCs based on an index such as importance of SC 26000, and the SC 26000 is restricted in descending order of priority. Also, a form may be adopted in which only some processing is restricted even within the same SC 26000.

In the SC weighting policy illustrated in FIG. 8, scoring is performed according to the TX approval conditions, but other measures (for example, the lightness of the logic processing load of the SC 26000) may be used for scoring.

In the TX restriction condition formulation logic illustrated in FIG. 14, the TX upper limit value is calculated for each organization, but it may be calculated for each client user under the organization or for each higher-level application that issues a TX.

In the example described above, the TX restriction management unit 21500 and the TX restriction condition information 21600 are in the distributed ledger node 20000, but they may be in the gateway node 10000 as well. Also, the TX restriction condition formulation logic may exist as an independent SC instead of within the initial block.

<Other Forms>

Figure 15:
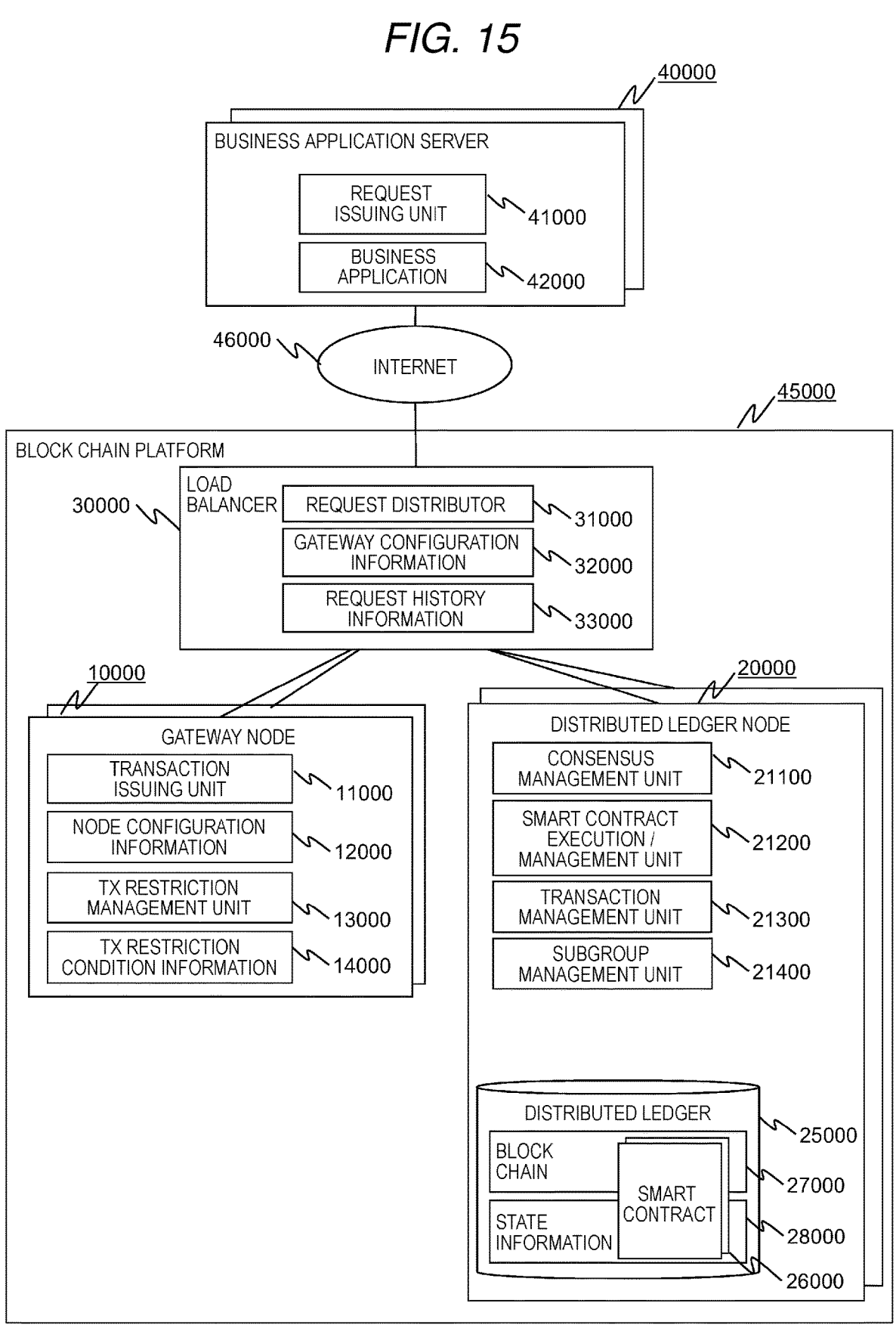
FIG. 15 is a diagram illustrating a configuration example of a computer system in the present embodiment.

FIG. 15 schematically illustrates another form of the business application server 40000 and the block chain platform 45000 assumed in the present embodiment.

The gateway node 10000 in this form includes a TX restriction management unit 13000 and a TX restriction condition information 14000 in addition to the transaction issuing unit 11000 and the node configuration information 12000.

The distributed ledger node 20000 does not have a TX restriction management unit or a TX restriction condition information, and the TX restriction management unit 13000 and the TX restriction condition information 140000 on the gateway node 10000 play equivalent roles. The contents other than the above are the same as those illustrated in FIG. 1.

FIG. 16 is an example in another form of the block chain 27000 which is one of the data structures managed on the distributed ledger 25000 of the distributed ledger node 20000.

The block 27020 is an example of a block storing a deploy TX of the SC 26000. The deploy TX 27400 in this example includes a contract ID that uniquely specifies the SC 26000, the logic (for example, executable binary) of the SC 26000, and the conditions necessary to obtain approval of the TX between participating organizations. It also includes contract input specifications for the user to understand the function name and its argument that the SC 26000 has.

In this example, "TX upper limit calculation" is defined as the function name of the SC 26000 having an ID of "SC0", and the logic of the function is also defined. Further, the logic of this function includes the TX restriction condition formulation logic illustrated in FIG. 14, the inter-organizational distribution policy 28000, the SC weighting policy 28100, and the TX restriction meta-condition 28200. The contents other than the above are the same as those illustrated in FIGS. 2 and 3.

As described above, by using the present invention, it is possible to guarantee above a certain number of accesses to distributed ledgers that can be executed per unit time for each organization participating in the BC service. The BC service vendor can secure reliability of the performance of the BC service and improve the value of the service by providing the customer with an access number upper limit management function by above means.

Although the best form for carrying out the present invention is specifically described above, the present invention is not limited to this, and can be variously modified without departing from the scope of the invention.

According to the present embodiment, for each organization participating in the BC service, it is possible to guarantee the number of accesses to the ledger that can be executed per unit time above a certain level. Also, the BC service vendor can provide a customer with an access number upper limit management function, ensure the reliability of the performance of the BC service, and improve the value of the service. As a result, a resource sharing status between the participating organizations in the BC service can be made appropriate, and the reliability of the BC service can be maintained satisfactorily.

At least the following is clarified by the description of this specification. That is, in the transaction management system of the present embodiment, a predetermined node may be further provided that manages configuration information of an organization on the distributed ledger for the organization that can participate in the distributed ledger system, and the plurality of nodes may calculate the transaction number upper limit for each organization by applying configuration information obtained from the predetermined node as input to a transaction number upper limit calculation rule.

According to this, it is possible to calculate the upper limit of the number of transactions based on the number of participants in the distributed ledger system, which is a business platform, and the increase or decrease of participants. As a result, a resource sharing status between the participating organizations in the BC service can be made more appropriate, and the reliability of the BC service can be better maintained.

Also, in the transaction management system of the present embodiment, the node may recalculate the upper limit number of transactions for each of the plurality of organizations based on the rules for calculating the upper limit of the number of transactions when the configuration information obtained from the predetermined node is changed.

According to this, even when there is a change in the participants to the distributed ledger system, which is a business platform, it is possible to accurately respond to this and dynamically calculate the upper limit of the number of transactions. As a result, the resource sharing status between the participating organizations in the BC service can be made more appropriate, and the reliability of the BC service can be better maintained.

Also, in the transaction management system of the present embodiment, the node may hold, in the rule for calculating the upper limit of the number of transactions, policy information for allocating the upper limit of the number of transactions for each of the plurality of organizations according to the attribute of the organization in an unbalanced allocating manner.

According to this, it is possible to manage the upper limit of the number of transactions according to the characteristics and importance of the organization. As a result, the resource sharing status between the participating organizations in the BC service can be made more appropriate, and the reliability of the BC service can be better maintained.

Further, in the transaction management system of the present embodiment, the nodes may share a smart contract, which is logic describing the conditions of transactions to be carried out between organizations participating in the distributed ledger system, upon agreement between the participants, and in the rule for calculating the upper limit of the number of transactions, when calculating the number of past transactions for each of the plurality of organizations, policy information may be held that changes the weighting for each smart contract according to a difference in the processing load of the smart contract.

According to this, it is possible to control the upper limit of the number of transactions based on the lightness of the processing load of the smart contract. As a result, the resource sharing status between the participating organizations in the BC service can be made more appropriate, and the reliability of the BC service can be better maintained.

In the transaction management system of the present embodiment, the node may hold an endorsement policy, which is a consensus level when forming a transaction consensus among organizations participating in the distributed ledger system, for each smart contract, and use the endorsement policy as a basis for weighting in the policy information regarding the weighting of the smart contract.

According to this, in addition to the processing load of the smart contract described above, it is possible to manage the upper limit of the number of transactions with favorable accuracy based on the characteristics of the endorsement. As a result, the resource sharing status between participating organizations in the BC service can be made more appropriate, and the reliability of the BC service can be better maintained.

In the transaction management system of the present embodiment, the node may specify a transaction as a past transaction in each of the plurality of organizations based on a timestamp of the transaction stored in the distributed ledger and each piece of information of an organization to which a transaction executor belongs, and calculate the number of transactions as the number of past transactions.

According to this, it is possible to specify transactions in a group such as transactions issued by a specific organization in the most recent predetermined period, and appropriately utilize them for calculating the upper limit of the number of transactions. As a result, the resource sharing status between participating organizations in the BC service can be made more appropriate, and the reliability of the BC service can be better maintained.

In the transaction management system of the present embodiment, a load balancer may be further provided that allocates transactions from a higher-level application to the nodes, where the load balancer holds a history of the transactions from the higher-level application as a log, and when the number of past transactions for each of the plurality of organizations is calculated, the node specifies a transaction based on a timestamp of the transaction and each piece of information on an organization to which a transaction executor belongs, which are held in the log of the load balancer, and calculates the number of transactions as the number of past transactions.

According to this, the number of past transactions can be calculated efficiently and accurately by the load balancer. As a result, the resource sharing status between participating organizations in the BC service can be made more appropriate, and the reliability of the BC service can be better maintained.

In the transaction management system of the present embodiment, the predetermined node may be a gateway node that acts on behalf of each process of consensus building and approval of a transaction in response to a request from a higher-level application.

According to this, the gateway node responsible for issuing actual transactions manages the node configuration information, which can be utilized for timely management of the upper limit of the number of transactions. As a result, the resource sharing status between participating organizations in the BC service can be made more appropriate, and the reliability of the BC service can be better maintained.

What is claimed is:

1. A transaction management system that is a distributed ledger system in which a business network is formed of a plurality of nodes, each node calculates an upper limit of a number of transactions that can be issued by each of a plurality of organizations according to a calculation rule shared among the nodes, and refuses to accept a transaction from an organization of the organizations of which the number of transactions in past exceeds the upper limit of the number of transactions, the transaction management system comprises a predetermined node that manages configuration information of an organization on a distributed ledger for the organization that can participate in the distributed ledger system, and the plurality of nodes calculate the upper limit of the number of transactions for each organization by applying the configuration information obtained from the predetermined node as input to the calculation rule for the upper limit of the number of transactions.

2. The transaction management system of claim 1, wherein each node, recalculates the upper limit of the number of transactions for each of the plurality of organizations based on the calculation rule for the upper limit of the number of transactions when the configuration information obtained from the predetermined node is changed.

3. The transaction management system of claim 1, wherein each node, holds, in the calculation rule for the upper limit of the number of transactions, policy information for allocating the upper limit of the number of transactions for each of the plurality of organizations according to an attribute of the organization.

4. The transaction management system of claim 1, wherein the nodes, share a smart contract, which is logic describing a condition of a transaction to be carried out between organizations participating in the distributed ledger system, upon agreement between participants, and in the calculation rule for the upper limit of the number of transactions, when a number of past transactions for each of the plurality of organizations is calculated, policy information is held that changes for each smart contract according to a difference in a processing load of the smart contract.

5. The transaction management system of claim 4, wherein each node, holds an endorsement policy, which is a consensus level when forming a transaction consensus among organizations participating in the distributed ledger system, for each smart contract.

6. The transaction management system of claim 1, wherein each node, specifies a transaction as a past transaction in each of the plurality of organizations based on a timestamp of the transaction stored in the distributed ledger and each piece of information of an organization to which a transaction executor belongs, and calculates a number of transactions as the number of past transactions.

7. The transaction management system of claim 1, further comprising:

a load balancer that allocates transactions from another application to the nodes, wherein the load balancer holds a history of the transactions from the higher-level application as a log, and when the number of past transactions for each of the plurality of organizations is calculated, each node specifies a transaction based on a timestamp of the transaction and each piece of information on an organization to which a transaction executor belongs, which are held in the log of the load balancer, and calculates a number of transactions as the number of past transactions.

8. The transaction management system of claim 1, wherein the predetermined node, is a gateway node that acts on behalf of each process of consensus building and approval of a transaction in response to a request from another application.

9. The transaction management system of claim 1, wherein the configuration information includes a field for registering the name of each node which belongs to each organization and to which a transaction is to be transmitted by a gateway node and a field for registering an ID of each organization, respectively.

10. A transaction management method, wherein in a distributed ledger system in which a business network is formed of a plurality of nodes, the method comprising the steps of:

calculating, by each node, an upper limit of a number of transactions that can be issued by each of a plurality of organizations according to a calculation rule shared among the nodes, and refusing to accept a transaction from an organization of the organizations of which the number of transactions in past exceeds the upper limit of the number of transactions, managing, by a predetermined node, configuration information of an organization on a distributed ledger for the organization that can participate in the distributed ledger system, and calculating, by each node, the upper limit of the number of transactions for each organization by applying the configuration information obtained from the predetermined node as input to the calculation rule for the upper limit of the number of transactions.

11. The transaction management method of claim 10, wherein the configuration information includes a field for registering the name of each node which belongs to each organization and to which a transaction is to be transmitted by a gateway node and a field for registering an ID of the organization, respectively.

* * * * *